(12) United States Patent
Zeitak

(10) Patent No.: US 7,809,016 B2
(45) Date of Patent: Oct. 5, 2010

(54) WEIGHTED FAIR BANDWIDTH DISTRIBUTION SYSTEM

(75) Inventor: Reuven Zeitak, Rehovot (IL)

(73) Assignee: Alcatel, Paris (FR)

( * ) Notice: Subject to any disclaimer, the term of this patent is extended or adjusted under 35 U.S.C. 154(b) by 891 days.

(21) Appl. No.: 11/559,802

(22) Filed: Nov. 14, 2006

(65) Prior Publication Data
US 2007/0121513 A1    May 31, 2007

(30) Foreign Application Priority Data
Nov. 30, 2005    (EP)    ............................ 05292539

(51) Int. Cl.
H04J 3/16    (2006.01)
(52) U.S. Cl. .................................. 370/468
(58) Field of Classification Search ............... 370/468, 370/463, 230, 235, 389, 230.1, 236, 231, 370/232, 362, 363, 412, 364, 365, 392, 235.1, 370/395.4, 395.41, 229, 429; 709/224, 226, 709/235; 710/52
See application file for complete search history.

(56) References Cited

U.S. PATENT DOCUMENTS

| | | | | |
|---|---|---|---|---|
| 5,768,271 | A * | 6/1998 | Seid et al. .................... | 370/389 |
| 5,831,971 | A | 11/1998 | Bonomi et al. | |
| 6,011,775 | A | 1/2000 | Bonomi et al. | |
| 6,192,032 | B1 * | 2/2001 | Izquierdo .................... | 370/230 |
| 6,452,933 | B1 * | 9/2002 | Duffield et al. .............. | 370/415 |
| 6,810,426 | B2 | 10/2004 | Mysore et al. | |
| 6,850,540 | B1 | 2/2005 | Peisa et al. | |
| 7,006,440 | B2 * | 2/2006 | Agrawal et al. .............. | 370/235 |
| 7,154,867 | B1 * | 12/2006 | James ......................... | 370/288 |
| 7,292,578 | B1 * | 11/2007 | Kerr et al. ............... | 370/395.32 |
| 7,330,477 | B2 * | 2/2008 | Hendel et al. ................ | 370/412 |

FOREIGN PATENT DOCUMENTS

EP    1 553 740 A1    7/2005

OTHER PUBLICATIONS

F. M. Chiussi et al, "Dynamic max rate control algorithm for available bit rate service in ATM networks" Global Telecommunications Conference, 1996. Globecom '96. Communications;; The Key to Global Prosperity, London, UK Nov. 18-22, 1996, New York, NY, US, IEEE, vol. 3 Nov. 18, 1996, pp. 2108-2117, XP010220247.

* cited by examiner

Primary Examiner—Chi H Pham
Assistant Examiner—Alexander Boakye
(74) Attorney, Agent, or Firm—Carmen Patti Law Group, LLC

(57) ABSTRACT

An efficient policer (210-1, . . . , 210-M) based weighted fairness bandwidth distribution system (200) is disclosed. The system (200) is based on a plurality of policers (210-1, . . . , 210-M) and at least one queue (220). To achieve fairness, the rate for queuing packets is adaptively controlled. Specifically, first the queue occupancy is determined and it then is used for computing an attenuation value (Attn). This value is multiplied by the excess information rate of each policer (210-1, . . . , 210-M) to get a new excess information rate to be enforced.

17 Claims, 5 Drawing Sheets

WEIGHTED FAIR BANDWIDTH DISTRIBUTION SYSTEM

BACKGROUND OF THE INVENTION

The invention is based on a priority application EP 05292539.3 which is hereby incorporated by reference.

The present invention relates generally to communication networks, and more particularly to techniques for queuing data traffic in communication networks.

Weighted fair queuing (WFQ) is a well known flow-based queuing technique. The WFQ simultaneously schedules interactive traffic to the front of the queue to reduce response time and it fairly shares the remaining bandwidth between high bandwidth flows. FIG. 1 shows a conventional WFQ system 100 that includes N queues 110-1 through 110-N. Each queue 110 serves a single source (or connection) and is assigned with a respective weight. Each packet leaving its respective queue 110 is forwarded directly to an output channel 120. The scheduling method implemented in WFQ system 100 ensures that the waiting time of packets in queues 110 is always in proportion to queue's weights.

For example, a WFQ system having three queues Q1, Q2, and Q3 and respectively assigned with the weights $W_1=5$, $W_2=2$, and $W_3=3$. The maximum allowable rate of the output channel is 10 MB/Sec. In this exemplary system, if all queues have packets waiting, then Q2 and Q3 receive a guaranteed bandwidth of 2 and 3 MB/Sec respectively, and Q1 receives a guaranteed bandwidth of 5 MB/sec. If Q1 does not have any packets waiting, then the excess bandwidth is equal to 5 MBS/second. In a WFQ system, this excess bandwidth is redistributed in proportion to the associated weights of the queues that have packets waiting. That is, when queue Q1 does not have packets waiting, the excess bandwidth is distributed proportionally to queues Q2 and Q3 so that they now receive bandwidth of 4 and 6 MB/Sec respectively.

One advantage of the WFQ technique is the end-to-end delay guarantees, i.e., each packet is guaranteed a certain rate for each packet flow in the stream. Another advantage is the underutilization of capacity when flow is particularly bursty idle time. In such case the WFQ technique facilitates the redistribution of the unused bandwidth so as to preserve work-conservation property. The drawback of the WFQ technique inherits in its implementation. The conventional WFQ systems are based on multiple queues, this configuration is costly and complicated. Furthermore, queue based system requires to maintain the state of each packet. This requirement is not compliant with most of the communication networks.

It would be therefore advantageous to provide an efficient weighted fairness bandwidth distribution system.

SUMMARY OF THE INVENTION

The present invention provides an efficient weighted fair policing (WFP) system capable of weighted fairness bandwidth distribution. The system is based on a plurality of policers connected to one or more queues. To achieve fairness, the policers adaptively control the rate of policed packets.

Further advantageous embodiments are defined in the dependent claims.

BRIEF DESCRIPTION OF THE DRAWINGS

Preferred embodiments of the invention will be described below with reference to the accompanying drawings, in which.

DETAILED DESCRIPTION OF THE INVENTION

Figure 1:
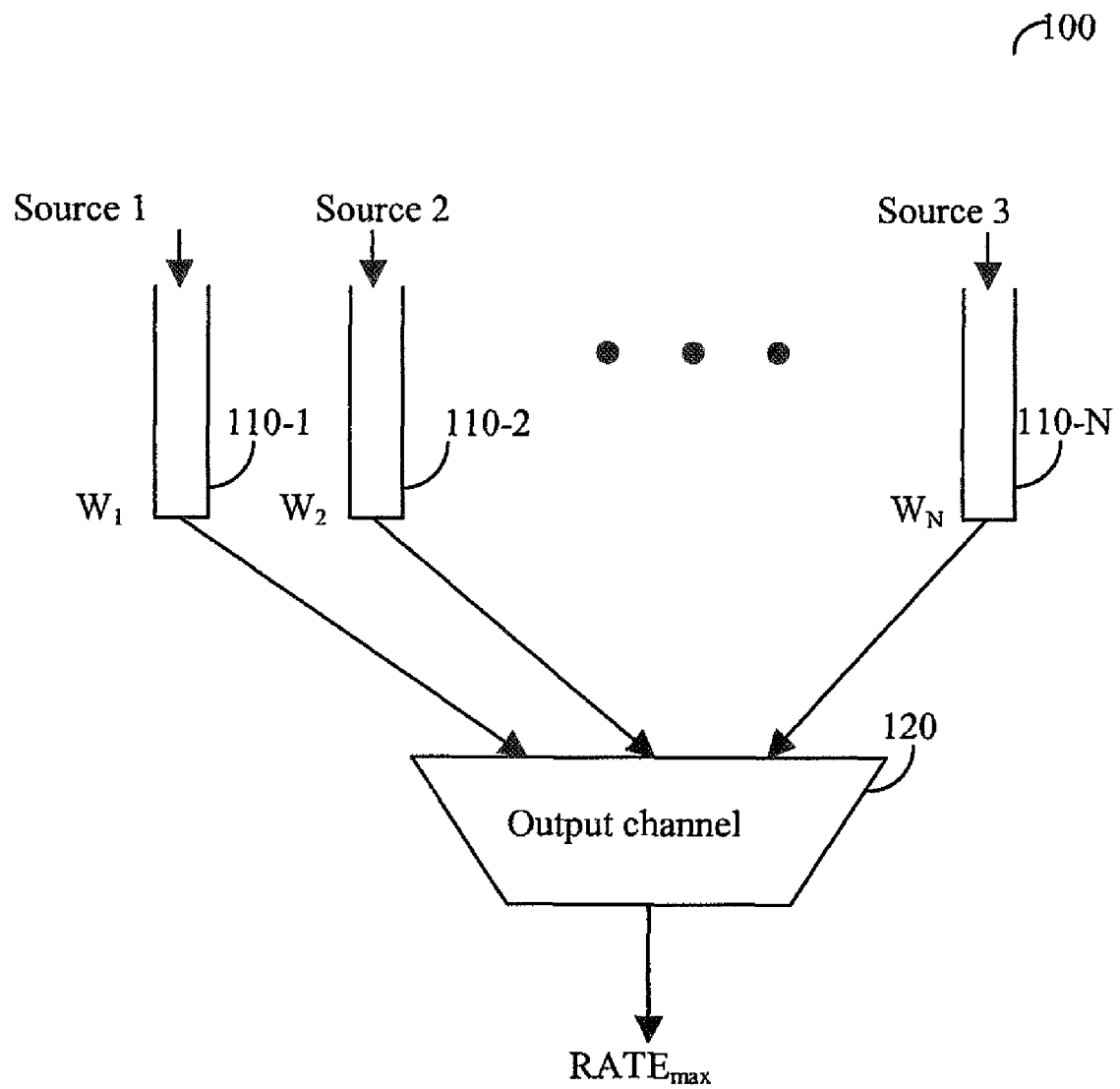
FIG. 1 shows a conventional WFQ system (prior art)
Figure 2:
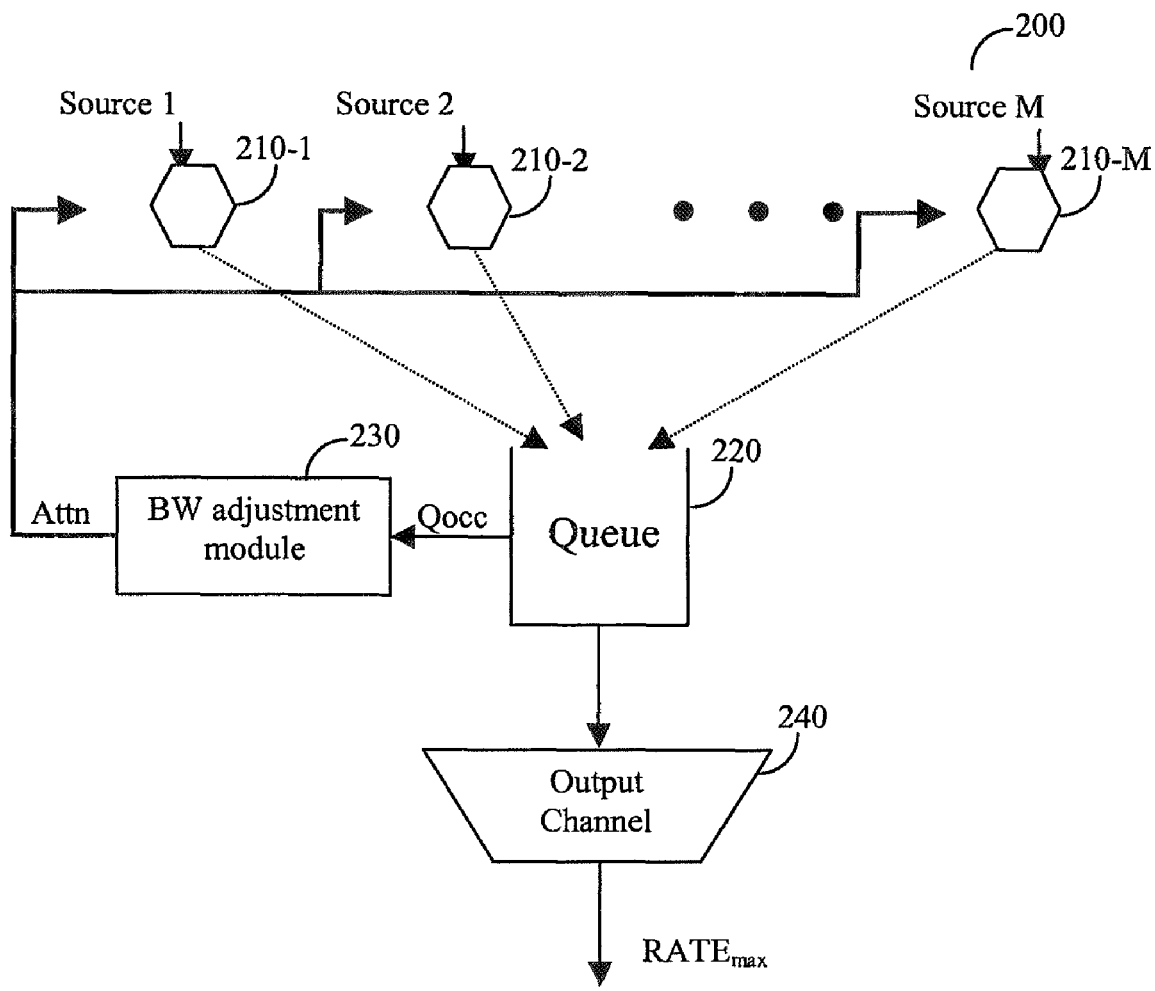
FIG. 2 shows a non-limiting an exemplary block diagram of an efficient weighted fairness system that discloses one embodiment of the present invention.

FIG. 2 shows a non-limiting and an exemplary block diagram of a WFP system 200 that discloses one embodiment of the present invention. WFP system 200 includes M policers 210-1 through 210-M connected to a single queue 220, a bandwidth adjustment module 230, and an output channel 240. Each policer 210 is parameterized by an input rate (InRate) and a maximum excess information rate ($EIR_{max}$). A policer is a rate limiting device that rejects data packets that arrive to the policer at an instantaneous rate that is above some predefined threshold rate. Specifically, each policer 210 is capable of handling a single data flow and computing a new EIR to be enforced. Namely, packets of a respective data flow are transferred from a policer 210 to queue 220 if their instantaneous rate does not exceed the rate equal to the newly computed EIR. The new EIR is computed according to the following equation:

$$EIR_{new} = Attn * EIR_{max}; \quad (1)$$

where the "Attn" parameter is determined by an attenuation function, as described in more detail below. The $EIR_{max}$ is the maximum bandwidth that a policer can transfer. In fact, the $EIR_{max}$ are preconfigured values that determine the weighs of the WFP algorithm. Data packets flowing through the policer cannot exceed InRate. An example for a policer 210 may be found in PCT application No. PCT/112004/00781 by Zeitak, entitled "A Policer and Method for Resource Bundling", assigned to a common assignee and hereby incorporated by reference for all that it contains.

Figure 3:
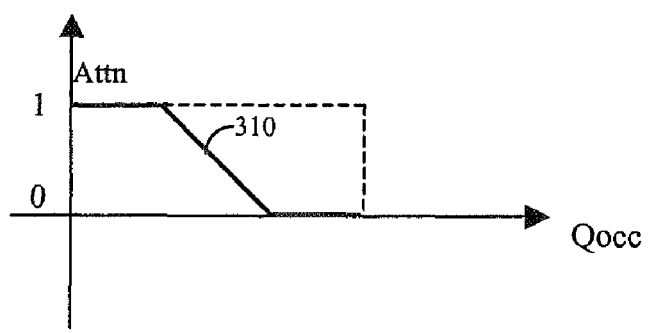
FIG. 3 shows a non-limiting and exemplary graph of an attenuation function.

The output rate of output channel 240 is determined by a maximum allowable rate (hereinafter the "$RATE_{max}$") parameter. Congestion occurs whenever the total rate that the policers 210 allow is in excess of the $RATE_{max}$. The bandwidth adjustment module 230 monitors the queue occupancy and queue ingress rate (hereinafter the "Qocc") and computes an Attn value using the attenuation function. FIG. 3 shows a non-limiting and exemplary graph of an attenuation function 310. As seen, the Attn value ranges between 0 and 1, where a 1 value is when queue 220 is empty and a 0 value is when the queue 220 is full. The Attn value is sent to each of policers 210, which in turn calculates the $EIR_{new}$ to be enforced. An exemplary embodiment of the attenuation function (AT) would be:

$$AT(Qocc) = \begin{cases} 1; \text{ if } Qocc < Th1[\text{changed}] \\ 0; \text{ if } Qocc > Th2 \\ \frac{Th2 - Qocc}{Th2 - Th1}; \text{ if } Th < Qocc < Th2 \end{cases} \quad (2)$$

where, Th2 is a normalization factor that determines the maximum occupancy (in bytes) of the queue and Th1 is a threshold equals to $\alpha*Th2$. The parameter $\alpha$ is configurable and in the exemplary embodiment is set to 0.6.

It should be appreciated by a person skilled in the art that policers are based on bandwidth, hence they cannot emulate a weight fair queuing. However, by utilizing the queue occupancy to adaptively and directly control the bandwidth of each policer, ensures fairness in respect to the maximum allowable rate. That is, by controlling the policer's bandwidth, a source transmitting at a rate that is lower than its $EIR_{max}$ may continue to deliver undistributed traffic; otherwise, the $EIR_{max}$ is reduced.

Figure 4:
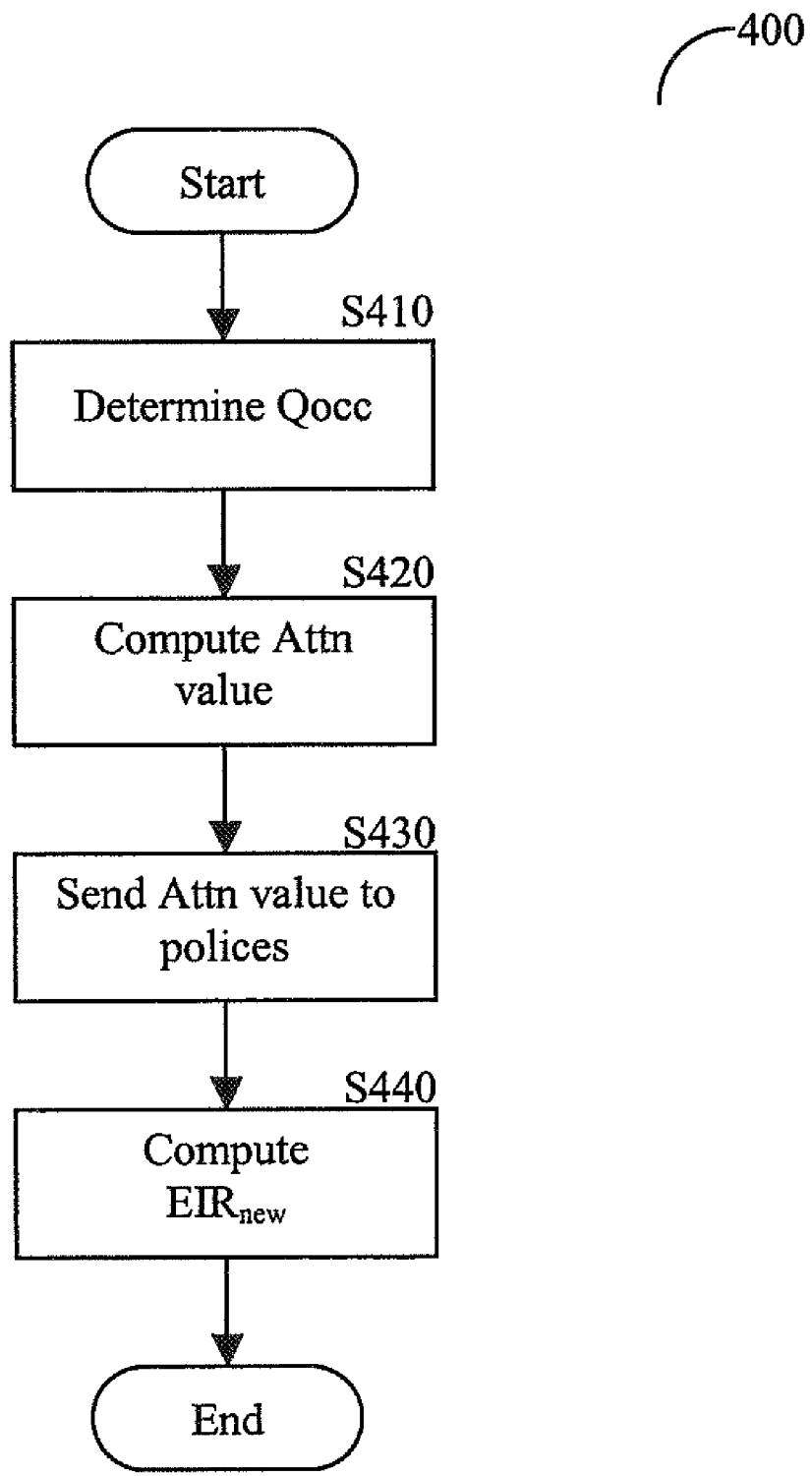
FIG. 4 shows an example for the operation the disclosed weighted fairness system.

FIG. 4 shows a non-limiting flowchart 400 describing method for performing a weighted fair queuing that discloses one embodiment of the present invention. The method applies only when congestion is detected. At S410, the Qocc value of queue 220 is determined. In one embodiment the Qocc is computed as the average depth of the queue and over time. This is performed by measuring the number of stored bytes in the queue each time that a packet is inserted or removed from the queue. Averaging the queue depth provides a stable value of the Qocc. At S420, the Attn value is computed using the Qocc based on attenuation function. The Attn value may be computed using equation 2. It should be noted that the Attn value may be slightly varied until it reaches its equilibrium point. This point is achieved when the following equation is satisfied:

$$RATE_{max} = \sum_{policers} \min(InRate, Attn*EIR_{max}). \quad (3)$$

Alternatively, in the case of no congestion the equilibrium point when the following equation is satisfied:

$$RATE_{max} < \sum_{policers} \min(InRate, EIR_{max}). \quad (4)$$

At S430, the Attn value is sent to each of policers 210. The Attn value is used for computing and enforcing the $EIR_{new}$ on incoming packets as shown at S440. The $EIR_{new}$ may be computed using equation 1.

Figure 5:
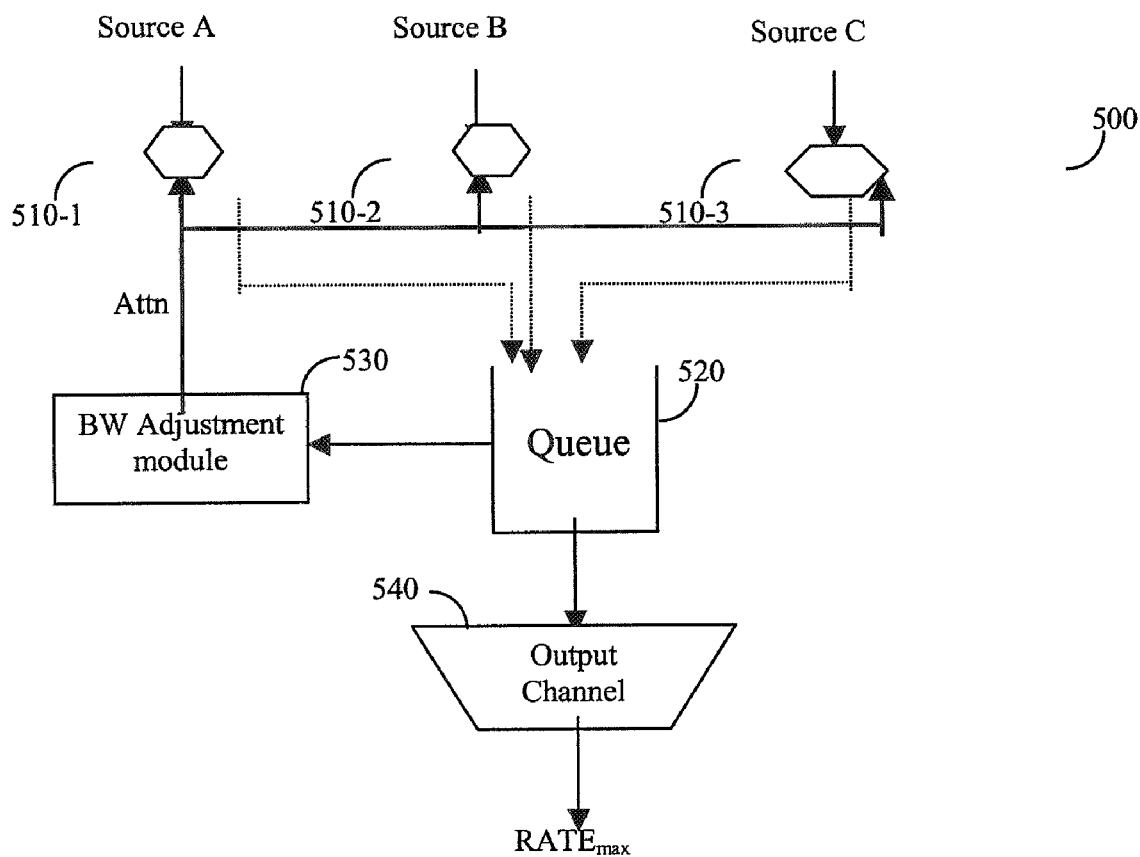
FIG. 5 shows a non-limiting flowchart describing method for performing a weighted fair policing that discloses on embodiment of the present invention.

Following is a non-limiting example describing the weighted fair queuing performed by the present invention. FIG. 5 shows an exemplary WFP system 500 that includes three policers 510-1, 510-2, and 510-3 connected to a queue 520. Each of policers 510-1, 510-2, and 510-3 is configured with an $EIR_{max}$ value that equals, for example, to 30 MB/Sec. A source A transmits packets through policer 510-1 at a rate that equals, for example, to 10 MB/Sec; a source B transmits packets through policer 510-2 at a rate that equals to, for example, 20 MB/Sec; and, the output rate of source C is, for example, 30 MB/Sec. The $RATE_{max}$ of output channel 540 is, for example, 30 MB/Sec. It is clear that in such exemplary configuration congestion occurs.

To fairly schedule packets of the input sources, the Attn value in computed. In the example above the equilibrium point is achieved when the Attn value is ⅓. This value is sent to policers 510-1, 510-2 and 510-3 that computes the $EIR_{new}$ values. The computed $EIR_{new}$ value of all policers 510-1, 510-2, and 510-3 equals to 10 MB/Sec. Policers 510 cannot transmit packets at a rate that exceeds the computed $EIR_{new}$, and therefore the policers together cannot deliver packets at a rate that is above $RATE_{max}$.

It should be noted that the Attn is adaptively changed according to traffic rates of the input sources. For instance, if source A stops transmitting packets then the depth of queue 520 reduces and therefore a new Attn value is generated. Here, the equilibrium is achieved when Attn value equals to ½. Accordingly, the $EIR_{new}$ values of policers 510-1 and 510-2 are set to 10 MB/Sec.

Figure 6:
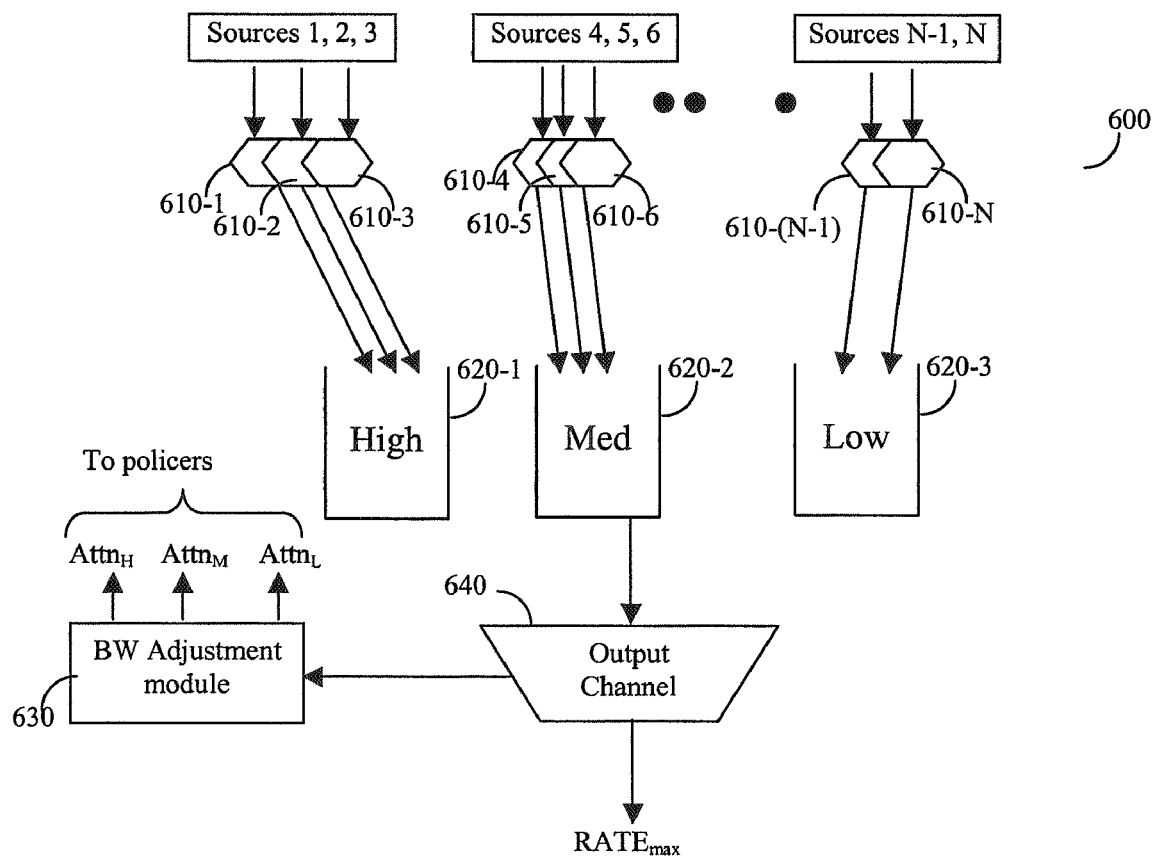
FIG. 6 shows a non-limiting an exemplary diagram of an efficient weighted fair policing system having prioritized queues that discloses one embodiment of the present invention.

In another embodiment of the present invention the principles of WFP technique disclosed herein can be utilized in systems having a plurality of queues, where each queue has its own priority. FIG. 6 shows an exemplary system 600 that includes N policers 610-1 through 610-N connected to queues 620-1, 620-2, and 620-3. The priorities assign to queue 620-1, 620-2, and 620-3 are high, low, and medium respectively. The priority determines the waiting time of packets in a queue, i.e., packets in a high priority queue are queued for relatively less time than packets in a low priority queue. In this embodiment, a different attenuation function is associated with each queue. The Attn function of low priority queue 620-3 ($AT_L$) is based on the Qocc of that queue, i.e., $AT_L=F[Qocc_L]$. The Attn function of medium priority queue 620-2 ($AT_M$) is based on the Qocc of that queue ($Qocc_M$) and on the occupation of CIR bytes QoccLC in the low priority queue 620-3, i.e., $AT_M=F[Qocc_M, QoccLC]$. The Attn function of high priority queue 620-1 ($AT_M$) is based on the Qocc of queue 620-1 as well as on the occupation of CIR bytes QoccLC in the the low priority queue 620-3 and the occupation of CIR bytes QoccMC in) the medium priority queue 620-3, i.e., $AT_M=F[Qocc_M, QoccMC, QoccLC]$. The use of the CIR occupation values of lower priority queues to set the value of higher priority queues is performed in order to deliver packets having a committed information rate (CIR) from lower priority queues. In fact, the Qocc_C of the low and medium priority queues is a function of the number of CIR bytes in the respective queue.

The invention claimed is:

1. A weighted fair policing system, for fairly distributing bandwidth of a plurality of data flows in a communication network, said weighted fair policing system comprises:
   a plurality of policers, each adaptively changing an excess information rate to be enforced where each policer comprises an associated excess information rate;
   at least one queue coupled to said plurality of policers; and
   a bandwidth adjustment module coupled to said at least one queue and said plurality of policers, wherein said bandwidth adjustment module controls said plurality of policers to change their excess information rates, wherein the excess information rates of the plurality of policers is changed in accordance with an occupancy of the at least one queue.

2. The weighted fair policing system of claim 1, further comprising an output channel coupled to said at least one queue.

3. The weighted fair policing system of claim 1, wherein said bandwidth adjustment module generates at least one attenuation value.

4. The weighted fair policing system of claim 3, wherein said at least one attenuation value varies between zero and one.

5. The weighted fair policing system of claim 3, wherein the excess information rate is changed in a linear proportion to said at least one attenuation value.

6. The weighted fair policing system of claim 5, wherein the excess information rate is changed according to the formula: $EIR = Attn * EIR_{max}$, wherein the $EIR_{max}$ is a maximum excess information rate that the policer enforces.

7. The weighted fair policing system of claim 3, wherein said at least one attenuation value is based on queue occupancy.

8. The weighted fair policing system of claim 7, wherein generating said at least one attenuation value comprises: monitoring said queue occupancy; and applying an attenuation function on said queue occupancy.

9. The weighted fair policing system of claim 8, further comprises: providing each of said plurality of policers with one of the at least one attenuation values wherein the bandwidth adjustment module provides the at least one attenuation value to the plurality of policers.

10. The weighted fair policing system of claim 1, wherein monitoring said queue occupancy comprises: measuring an average depth of said at least one queue.

11. The weighted fair policing system of claim 1, comprising a plurality of queues coupled to said plurality of policers, wherein each of said plurality of queues is assigned with a different priority and wherein said bandwidth adjustment module computes a different attenuation value for each of said plurality of queues.

12. The weighted fair policing system of claim 11, wherein the attenuation value of a higher priority queue is based at least on the attenuation value of a lower priority queue.

13. The weighted fair policing system of claim 11, wherein said attenuation value is a function of a number of committed information rate packets in a respective queue.

14. The weighted fair policing system of claim 1 wherein enforcing the excess information rate further comprises rejecting data packets that exceed the excess information rate.

15. A method for fairly distributing, bandwidth of a plurality of data flows by performing weighted fair policing where the method executes on at least one hardware policer, said method comprises the steps of: computing an attenuation value (Attn), said attenuation value determines current congestion; and adaptively changing an excess information rate to be enforced using said attenuation value wherein the excess information rate is changed in accordance with an occupancy of an at least one queue; wherein adaptively changing said excess information rate further comprises: receiving said attenuation value at a plurality of policers; and by each of said plurality of policers, computing a new excess information rate value to be enforced.

16. The method of claim 15, wherein computing said attenuation value further comprises: monitoring occupancy of the at least one queue; and using the queue occupancy and an attenuation function for determining said attenuation value.

17. The method of claim 15, wherein monitoring the queue occupancy comprises measuring an average depth of the at least one queue.

* * * * *